United States Patent [19]
Tong

[11] 3,908,169
[45] Sept. 23, 1975

[54] FREQUENCY SHIFT DEMODULATOR HAVING A VARIABLE CLOCK RATE

[75] Inventor: Shih Yung Tong, Middletown, N.J.

[73] Assignee: Bell Telephone Laboratories, Incorporated, Murray Hill, N.J.

[22] Filed: Mar. 22, 1974

[21] Appl. No.: 453,932

[52] U.S. Cl. ................ 325/320; 178/66 R; 329/104
[51] Int. Cl. ................ H04l 27/14
[58] Field of Search ............ 325/320, 30; 178/66 R; 329/104

[56] References Cited

UNITED STATES PATENTS

| | | | |
|---|---|---|---|
| 3,600,680 | 8/1971 | Maniere | 325/320 |
| 3,623,075 | 11/1971 | Bench et al. | 178/66 R |
| 3,760,412 | 9/1973 | Barnes | 329/104 |
| 3,778,727 | 12/1973 | Williams | 325/320 |
| 3,814,918 | 6/1974 | Nash et al. | 325/320 |

*Primary Examiner*—George H. Libman
*Attorney, Agent, or Firm*—J. P. Kearns

[57] ABSTRACT

Frequency-shift data signals, in particular those whose maximum data transmission rate is comparable to the carrier frequency, are accurately demodulated by digital means through the use of binary counters which are regularly reset by zero-crossing transitions in the received signals. An averaging counter arrangement driven by a free-running high-speed clock whose rate greatly exceeds the maximum data rate continuously computes the period of received signals. Counts corresponding to successive periods are transferred to a threshold counter arrangement which effectively counts up or down at further clock rates proportional to the periods of preselected mark and space frequencies toward predetermined threshold count levels which indicate transitions in the baseband data signals. The threshold counter arrangement need only count in one direction provided the counts from the averaging counter arrangement corresponding to the lower frequency-shift frequency are complemented before transfer to the threshold counter arrangement.

10 Claims, 3 Drawing Figures

FREQUENCY SHIFT DEMODULATOR HAVING A VARIABLE CLOCK RATE

FIELD OF THE INVENTION

This invention relates to the demodulation of frequency-shift-modulated telegraphic and data transmission signals by continuous measurement of the period of modulated received waves.

BACKGROUND OF THE INVENTION

There are three basic tecniques susceptible to digital realization for demodulating frequency-shift data signals which can assume two or more different signal states consecutively in time. They are time averaging by conversion of the received waveform into a train of uniform pulses coincident with zero crossings for low-pass filtering; by phase locking to a voltage-controlled oscillator; and by continuous period measurement of half-cycles or cycles of the received waveform. The latter technique has been found to be particularly advantageous where the modulating frequency is varying rapidly with respect to the shift or "carrier" frequencies.

Prior embodiments of the period measuring technique have comprised a high-speed binary counter regularly reset by transitions in the received frequency-shift wave, an integrator gated by the maximum count between transitions, a sample-and-hold circuit to store alternate integrator levels and a comparator for determining whether succeeding integrator levels — with respect to preceding levels — were higher, lower or unchanged. The integrator in effect performed a digital-to-analog conversion of the maximum state of the counter. The prior art implementation is thus a hybrid arrangement combining both digital and analog elements.

It is the object of this invention to demodulate frequency-shift data signals having two or more states by wholly digital means.

It is another object of this invention to demodulate frequency-shift data signals using binary counters to perform the integration, sample-and-hold and comparison functions of prior-art demodulators, as well as the period-measuring function.

It is a further object of this invention to provide a frequency-shift demodulator susceptible of implementation by integrated circuits.

SUMMARY OF THE INVENTION

According to this invention, demodulation of frequency-shift digital data signals having two or more states is accomplished by differentiating the amplitude-limited received signal to obtain a train of narrow pulses coincident with zero crossings therein, continuously resetting with such pulse train a first binary counter free-running at a rate several orders of magnitude greater than any of the shift frequencies, transferring maximum count levels attained between pulses by the first counter in digital form to a second binary counter having a selectable counting rate proportional to the shift frequencies being demodulated, selectably monitoring the count level of such second counter for predetermined threshold count levels corresponding to the shift frequencies being demodulated, and determining the stable state of a multistable circuit in accordance with the threshold count level last exceeded, such stable state not only indicating the discrete recovered data symbol but also controlling the selectable counting rate and counting direction for such second counter.

The first counter continuously measures the duration of half-cycles of the received frequency-shift signal. However, by cascading similar counter sections an averaging function can be achieved whereby succeeding sections achieve count levels measuring the periods of increasing integral numbers of half-cycles, i.e., one section measures the period between adjacent zero-crossing pulses (one half-cycle of the received wave), two sections measure the period between alternate zero-crossing pulses (one full cycle of the received wave) and so forth. Count levels can be transferred between sections in parallel or in series, as will become obvious hereinafter.

The second counter can alternatively be arranged to count in either direction and be alternately incremented or decremented periodically by the count levels of the first counter in the binary case or count in a single direction and be alternately incremented by the direct or complement form of the count level of the first counter. The threshold levels can be monitored by logic gates prearranged for enablement according to the binary representation of predetermined threshold levels.

The single counting rate of the first counter can be determined by a stable clock circuit and the selectable counting rates of the second counter can be achieved by frequency division of the output of the stable clock.

Because of the digital implementation of this invention, the frequencies to be detected are a function of the frequency division ratios applied to the stable clock output and the monitoring threshold levels only.

DESCRIPTION OF THE DRAWING

The objects, features and advantages of this invention will become more readily apparent from a consideration of the following detailed description and the drawing in which.

DESCRIPTION OF THE PREFERRED EMBODIMENT

Figure 1:
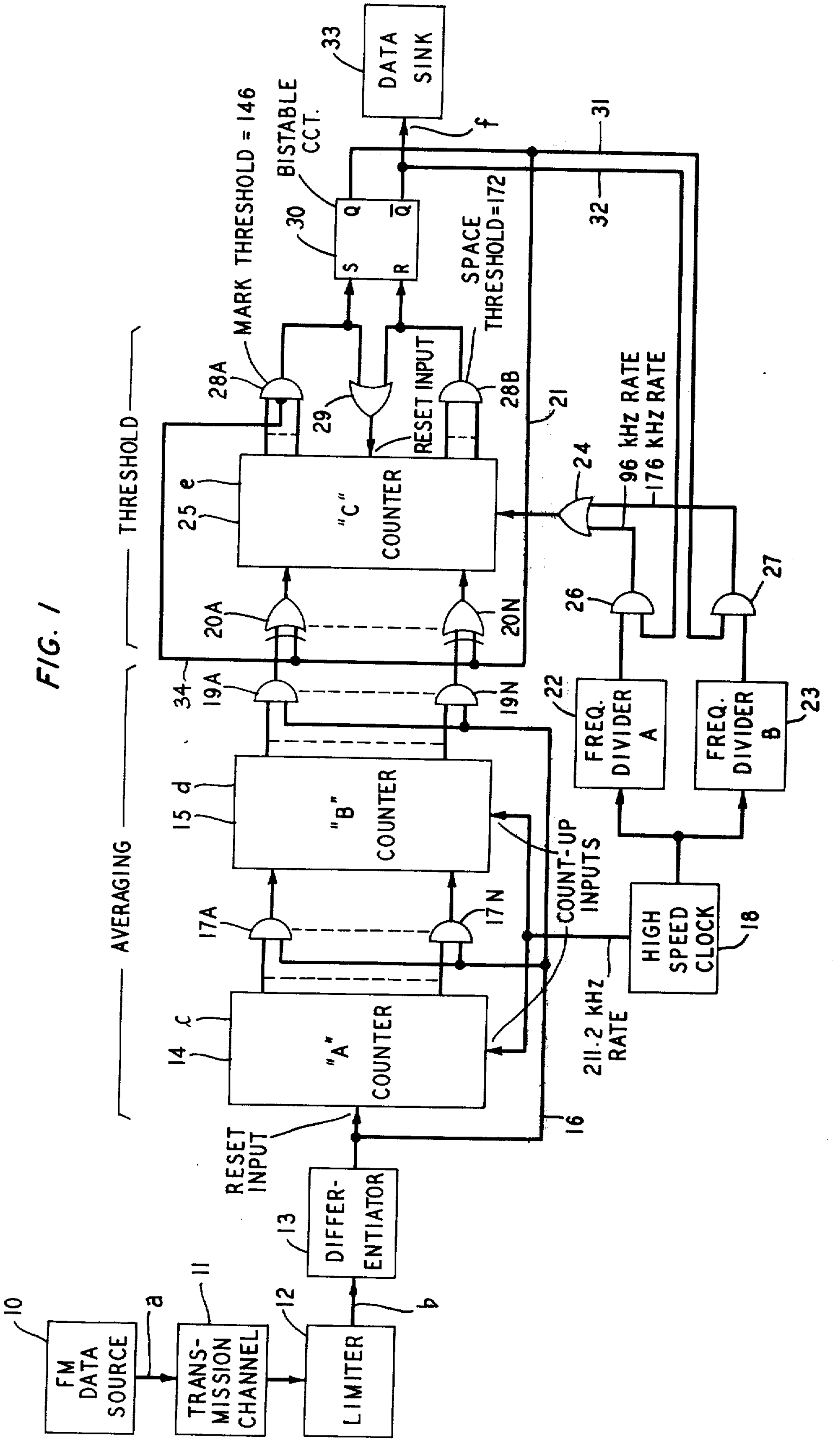
FIG. 1 is a schematic block diagram of a binary frequency-shift data transmission system including a digital demodulator according to this invention.

FIG. 1 is a schematic diagram of a frequency-shift modulated data transmission system for conveying data signals from a data source 10 to a data sink 33 over a transmission channel 11, such as a band-limited telephone voice channel. The data signals for purposes of illustration are binary in nature and may be synchronously timed to convey alphanumeric information or asynchronous to convey, for example, graphic information. The binary states of the data signal are represented by nominal frequencies $f_m$ and $f_s$ at 1200 and 2200 Hz, respectively. The synchronous rate and the maximum asynchronous rate are set at a nominal 1800 Hz. It is seen that at the synchronous rate only 9/11 of a cycle of the spacing frequency is available to identify a particular data symbol. Accordingly, analog discriminators employing tuned circuits would be entirely inadequate for the task of demodulating such a received signal.

Binary data signals are modulated onto the respective marking and spacing frequencies $f_m$ and $f_s$ and applied to channel 11 by conventional means. The receiver includes a limiter 12 for squaring up the substantially sinusoidal signal received from channel 11 and thus more precisely locating zero crossings therein. As these zero crossings define the boundaries of each half-cycle of the received wave, the limited signal from limiter 12 is differentiated in differentiator 13 to generate a train of uniform narrow pulses marking the zero-crossing times.

Figure 3:
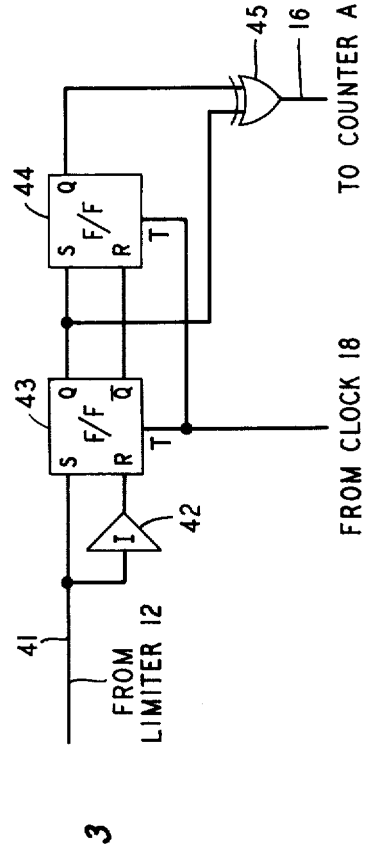
FIG. 3 is a schematic block diagram of a digital differentiator useful in the practice of this invention.

Differentiator 13 is readily realized in digital form as shown in FIG. 3. The digital differentiator comprises a pair of tandem connected bistable circuits (flip-flops) 43 and 44, an inverter 42 and an exclusive-OR gate 45. Each of flip-flops 43 and 44 includes set (S) and reset (R) inputs which control the complementary outputs Q and $\overline{Q}$ and a toggle (T) input. In operation whenever the input at S or R goes high the corresponding output Q or $\overline{Q}$ goes high, provided the T input is simultaneously high. Inputs S and R of flip-flop 43 are provided by the limited received signal on lead 41 from limiter 12 in FIG. 1 in direct form at input S and in complemented form on lead R after inversion in inverter 42. The outputs Q and $\overline{Q}$ of flip-flop 43 are directly connected to the S and R inputs of flip-flop 44. Toggle inputs from high-speed clock 18 are furnished to both of flip-flops 43 and 44. The Q outputs of both flip-flops 43 and 44 are combined in exclusive-OR circuit 16, whose output forms the overall differentiated output on lead 16, also shown in FIG. 1.

In operation the output states of flip-flop 43 follow the limited received signal input appearing on lead 41. The output states of flip-flop 44 in turn follow the output states of flip-flop 43 after a relatively small propagation delay. Exclusive-OR gate 45 multiplies together the Q outputs of flip-flops 43 and 44. Since these two outputs are nearly identical square-wave trains, the output of gate 45 constitutes a train of sharp spikes having a width determined by the slight propagation delay between flip-flops 43 and 44 and occurring substantially at the transition or zero-crossing instants of the received signal wave.

The zero-crossing pulse train controls the resetting times of a first or averaging counter having one or more sections shown in FIG. 1 as "A" counter 14 and "B" counter 15. Each of the sections constituting the averaging counter can comprise a multistage shift register with provision for transferring the condition of each stage of counter A to a corresponding stage of counter B through coincidence or AND-gates 17A through 17N. (The broken line between gates 17A and 17N suggests the presence of intermediate gates of the same type and function.) Each of the A and B counters is arranged to count up at a rate determined by high-speed clock 18, which for illustrative purposes is chosen to be 211.2 kHz to provide 96 counts for a full cycle of the spacing frequency $f_s$ at 2200 Hz and 176 counts for a full cycle of the marking frequency $f_m$ at 1200 Hz. Counters A and B illustratively have eight stages for a maximum count level of 256.

The output of differentiator 13 is applied directly to counter A for resetting to a zero or other reference state at each zero crossing of the received wave and indirectly to counter B through AND-gates 17 to transfer the status of counter A to counter B just prior to resetting counter A to its reference state. Counter B continues its upward count at the 211.2-kHz rate from the transferred count level of counter A as it existed just prior to reset. Accordingly, counter B is effectively counting to a level corresponding to a full cycle of the received wave, or more precisely to the sum of the counts for two succeeding half-cycles. Thus, counter B tends to average over two half-cycles of the received wave. Averaging over a longer interval can readily be achieved by inserting additional counter sections between counters A and B.

As an alternative, a single counter A can be arranged to count over a full cycle of the received wave if pulses from differentiator 13 are limited to those corresponding to zero crossings of one sense only, e.g., positive-going transitions only. In addition, it is clear that the contents of counter A can be transferred to counter B in serial order by conventional means.

The output of the averaging counter, whether comprising one or more than one section, is similarly transferred to a multistage threshold counter 25, also designated counter C. Counter C is structurally the same as counters A and B, but is arranged to count up at rates proportional with respect to the rate of clock 18 to the marking and spacing frequencies. Frequency dividers 22 and 23, driven by clock 18, provide outputs proportioned to the clock rate by the ratio of the difference between the mark and space frequencies to the respective mark and space frequencies. Illustratively, frequency divider A divides the clock rate of 211.2 kHz by the ratio $(f_s - f_m)/f_s$ or 211.2 (2200 − 1200)/2200 to obtain a 96-kHz output. Similarly, divider B divides the clock rate by the ratio $(f_s - f_m)/f_m$ to obtain a 176-kHz output. These counting rates of 96 and 176 kHz are applicable in the alternative through AND-gates 26 and 27 and OR-gate 24 to the count input of threshold counter C.

The count outputs of counter B are transferred to counter C through AND-gates 19A through 19N and exclusive-OR gates 20A through 20N upon the occurrence of each zero-crossing pulse from differentiator 13. Exclusive-OR gates, as is well known, perform an effective binary multiplication of their inputs, i.e., like inputs produce one binary ouput state, and vice versa. By means of exclusive-OR gates 20, the count level of the averaging counter is loaded into counter C either in direct or complement form in accordance with a control signal on lead 21 from bistable circuit 30.

The output state of counter C is monitored by AND-gates 28A and 28B whose inputs are connected to those stages of counter C representing preselected mark and space thresholds in binary form. For a mark threshold count of 146, for example, the first, fourth and seventh stages in order of increasing significance of counter C are connected to the input of AND-gate 28A. Similarly, for a space threshold of 172, the second, third, fifth and seventh stages of counter C are connected to AND-gate 28B. The outputs of threshold AND-gates 28A and 28B are connected through OR-gate 29 to counter C to reset it to a reference condition, usually all-zero. These same outputs are connected to respective set and reset inputs of bistable circuit 30 so that when the mark threshold is crossed, bistable output Q goes high and $\overline{Q}$ goes low. Likewise, bistable output $\overline{Q}$ becomes high and Q becomes low when the space threshold is crossed.

The reset output $\overline{Q}$ of bistable circuit 30 is the demodulated data output of the receiver and is applied to data sink 33. A high $\overline{Q}$ output also enables AND-gate 26 to admit the lower 96-kHz counting rate to counter C and to place a low input on exclusive-OR gates 20, thereby transferring the level of counter B directly to counter C. A high Q output, indicating the demodulation of a data mark enables AND-gate 27 to admit the higher 176-kHz counting rate to counter C and to place a high input on exclusive-OR gates 20, thereby transferring the complement of the level of counter B to counter C. In the illustrative embodiment, in which an eight-stage counter is assumed, the maximum all-one count is equivalent to decimal 255 and therefore the complement of the maximum counter B level of decimal 176 or binary 10110000 for a received marking frequency is decimal 79 or binary 01001111.

Figure 2:
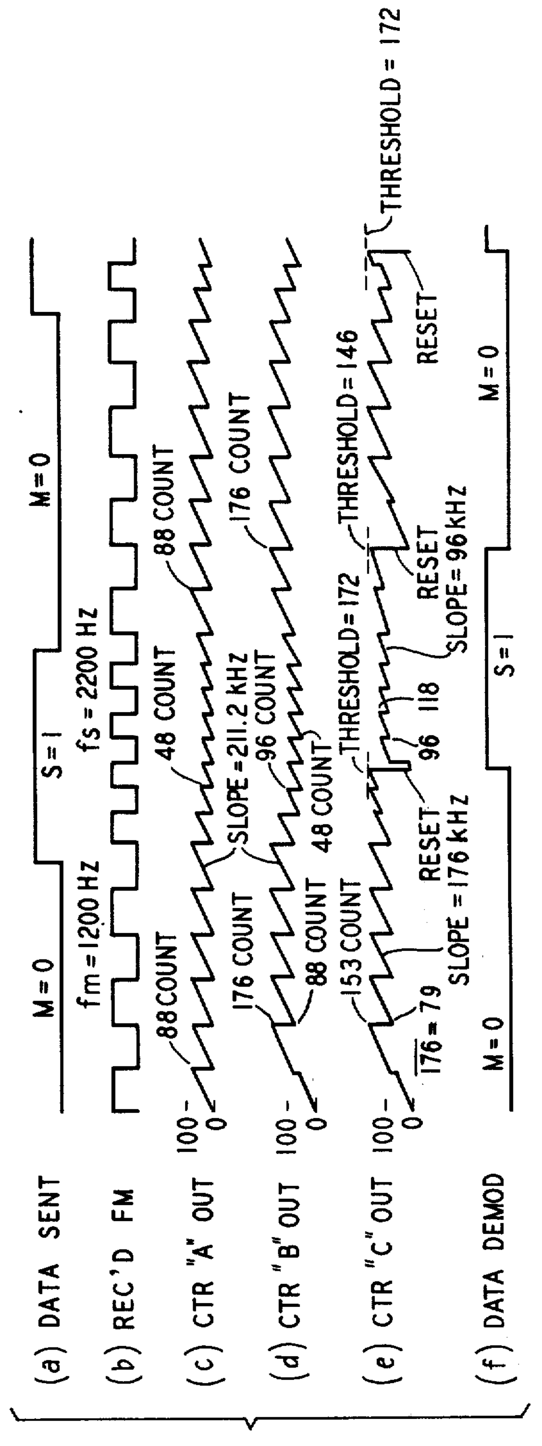
FIG. 2 is a set of waveform diagrams useful in explaining the operation of this invention.

A clear understanding of the operation of the two-state digital frequency-modulation discriminator of this invention can be obtained with the aid of the waveform diagrams of FIG. 2. Line (a) of FIG. 2 shows the waveform of a representative baseband binary data sequence MSM, which illustrates both mark-to-space and space-to-mark transitions. Line (b) of FIG. 2 illustrates the received passband line signal, which has traversed channel 11 and limiter 12. It will be observed that marks are encoded on the lower 1200-Hz frequency and spaces on the higher 2200-HZ frequency and further that the transitions in the baseband data wave on line (a) are arbitrarily located with respect to the transitions in the received wave on line (b). Line (c) of FIG. 2 shows the instantaneous count level of the output of counter A in analog sawtooth form. The ramp slopes are uniform at the clock rate of 211.2 KHz. Counter A is reset at each transition in the received wave and reaches a maximum count of 88 on half-cycles of the marking frequency of 1200 Hz and maximum count of 48 on half-cycles of the spacing frequency. On a mark-to-space transition the half-cycle count declines from 88 to 48 over a span of a single cycle. On a space-to-mark transition the count increases from 48 to 88 in a single cycle.

Line (d) of FIG. 2 shows in a similar analog ramp form the instantaneous count level of the ouput of counter B. The ramp slope is the same as on line (c). At each received-wave transition the state of counter A is transferred to counter B, which continues to count to a level corresponding to the period of a full cycle of the received wave, i.e., the interval between zero crossings of the same sense. For steady mark, counter B remains within the approximate range of 88 and 176 counts in the illustrative example. For steady space, counter B occupies the range from approximately 48 to 96 counts. The exact counts are affected by the presence of noise pulses in the received signal.

Line (e) of FIG. 2 shows the instantaneous count level of threshold counter C which has the state of counter B transferred to it in direct or complemented form at each transition in the received wave and counts up from the transferred counter B level at one or the other of the preselected proportional rates of 96 or 176 kHz and is reset to a reference level when the preassigned threshold is attained. For the steady marking condition counter C is returned to the complement of the counter B level of approximately decimal 79 and counts up at the 176-kHz rate about 74 counts to attain a level near 153 at transition time. Approaching a mark-to-space data transition, the level of counter B declines and its complement increases so that with the superposed 176-kHz count level 153 in counter C is exceeded and at a threshold level of about 172 AND-gate 28B is enabled and counter C is reset to a reference state, usually at or near zero by way of OR-gate 29. Threshold level 172 is approximately halfway between a steady-state marking-signal maximum count level of 153 and the maximum level of 193 that would be reached at the spacing frequency in the absence of the threshold monitor.

At the mark-to-space transition it will be observed that the state of counter C quickly exceeds the marking-frequency maximum to reach the threshold within very few shortened half-cycles. Bistable circuit 30 is reset on achieving the space threshold, exclusive-OR gates 20 are placed in a noncomplementing condition and AND-gate 26 is enabled so that the 96-kHz counting rate is applied to counter C. Thereafter, during the presence of the spacing frequency, counter C is restored to the 96-count level of counter B at received-signal transitions and counter C counts up from this level approximately 22 counts to a level of about 118 at the 96-kHz rate. The marking threshold of about 146 (approximately halfway between 118 and 176) is monitored so that as the level of counter B increases beyond level 118 a transition in the data signal from space to mark is quickly recognized. On attainment of this threshold, bistable circuit 30 is set, counter C is reset to a normally zero reference condition, and the 176-kHz output of frequency divider 23 is restored to counter C.

Line (f) of FIG. 2 shows the demodulated baseband data signal applied to data sink 33. The demodulated baseband signal is seen to be a slightly delayed replica of the transmitted baseband signal shown on line (a) of FIG. 2.

During the marking condition of the received wave, the crossing of the lower threshold has no effect on bistable circuit 30 which is already in the set condition. However, an inadvertent resetting of counter C can occur by way of OR-gate 29. This undesirable occurrence is prevented by providing mark threshold gate 28A with an inhibit input as shown in FIG. 1. This inhibit input is activated by extension 34 of feedback control lead 21 as long as the Q output of bistable circuit 30 is high.

The principle of this invention can be extended to a multistate frequency-shift wave in a straightforward manner by employing a multistable decision circuit, a plurality of threshold monitors and additional frequency dividers.

While this invention has been described by way of a particular embodiment employing specific shift frequencies, it will be apparent to one skilled in the art that its principle is susceptible of modification within the spirit and scope of the following claims.

What is claimed is:

1. A frequency-shift demodulator for digital data encoded on signal waves having two or more preassigned discrete frequencies comprising free-running high-speed counter means resettable to a reference state responsive to the passage through zero of received signal waves, threshold counter means responsive to maximum count levels achieved by said high-speed counter means between said passages through zero, means for supplying to said threshold counter means selectable counting rates proportional to said preassigned discrete frequencies, means for establishing threshold count levels for the output of said threshold counter means corresponding to data transitions in said signal wave, and output means having two or more stable states responsive to the court level in said threshold counter means exceeding a particular threshold count level corresponding to a demodulated data state for selecting a predetermined counting rate for said threshold counter means.

2. The frequency-shift demodulator defined in claim 1 in which said digital data is binary.

3. The frequency-shift demodulator defined in claim 1 in which signal waves are differentiated to establish the instants of passage through zero.

4. The frequency-shift demodulator defined in claim 1 in which said high-speed counter is reset to a reference state responsive to the passage of said received signal waves through zero in directions of both increasing and decreasing amplitude.

5. The frequency-shift demodulator defined in claim 1 in which said high-speed counter is reset to a reference state responsive to the passages through zero of said received signal in one preselected direction only.

6. A frequency-shift demodulator for binary data encoded by preassigned mark and space frequencies comprising differentiating means responsive to zero crossings in a received frequency-shift signaling wave, free-running high-speed clock means, means resettable responsive to zero crossings detected by said differentiating means for storing maximum count levels achieved by said clock means between zero crossings in said signal wave, threshold counter means having selectable counting rates proportional to respective mark and space frequencies, means for selectively transferring maximum count levels in said storing means either directly or in complement form to said threshold counter, means for establishing threshold count levels for the output of said threshold counter corresponding to respective mark-to-space and space-to-mark transitions in said signal wave, and bistable output means responsive in the alternative to the count in said threshold counter exceeding either of said threshold levels for resetting said threshold counter and for selecting a predetermined counting rate for said threshold counter.

7. The frequency-shift demodulator defined in claim 6 in which said storing means comprising a single multistage counter.

8. The frequency-shift demodulator defined in claim 6 in which said storage means comprises a plurality of multistage counters and coincidence gating means for transferring the stored contents of each preceding counter to a succeeding counter in response to zero crossings detected by said differentiating means.

9. The frequency-shift demodulator defined in claim 6 in which said means for transferring maximum count levels from said storage means to said threshold counter comprises a plurality of exclusive-OR gates controlled by the output state of said bistable means.

10. The frequency-shift demodulator defined in claim 6 in which said means for establishing threshold count levels comprises coincidence gates having inputs connected to predetermined stages of said threshold counter means.

* * * * *